United States Patent Office 3,592,594
Patented July 13, 1971

---

3,592,594
PROCESS FOR THE MANUFACTURE OF
PHOSPHORUS PENTAFLUORIDE
Robert A. Wiesboeck, Atlanta, Ga., assignor to United
States Steel Corporation, Pittsburgh, Pa.
No Drawing. Filed Jan. 5, 1968, Ser. No. 695,857
Int. Cl. C01b 25/10
U.S. Cl. 23—205                                      6 Claims

ABSTRACT OF THE DISCLOSURE

Phosphoryl fluoride is reacted with sulfur trioxide to form a phosphoryl fluoride-sulfur trioxide adduct and the adduct can be solvolyzed by hydrogen fluoride to form phosphorus pentafluoride and sulfuric acid. The phosphoryl fluoride-sulfur trioxide adduct is a new compound in the form of a colorless liquid having a lower vapor pressure than its individual components by a factor of about 10.

BACKGROUND AND SUMMARY

Conventional processes for the manufacture of phosphorus pentafluoride are based on the halogen exchange of phosphorus pentafluoride with arsenic trifluoride:

$$3PCl_5 + 5AsF_3 \rightarrow 3PF_5 + 5AsCl_3$$

or on the chlorofluorination of phosphorus trifluoride:

$$5PF_3 + 3Cl_2 \rightarrow 3PF_5 + 2PCl_3$$

Both methods require extensive fractionation to separate mixed halides ($PClF_4$, $PCl_2F_3$, etc.) from phosphorus pentafluoride.

In contrast with the conventional methods which are complicated and which produce the mixed halides, I have discovered that $PF_5$ can be produced in a very simple operation and the product is free of chlorine. Further, the new compound, phosphoryl fluoride-sulfur trioxide, serves as a useful intermediate in the forming of phosphorus pentafluoride, and it is also useful as a product in that it can be shipped in liquid form to a separate station for conversion to phosphorus pentafluoride and sulfuric acid.

It was found that phosphoryl fluoride forms an adduct with sulfur trioxide which can be solvolyzed by hydrogen fluoride to form phosphorus pentafluoride and sulfuric acid:

The liberated phosphorus pentafluoride is obtained in high purity and in good yield.

DETAILED DESCRIPTION

Phosphoryl fluoride and sulfur trioxide form an adduct which is in equilibrium with the unassociated species:

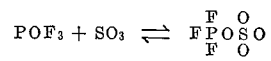

Equimolar quantities of $POF_3$ and $SO_3$ produce a colorless liquid which freezes at $-60°$ C., fumes in moist air, and has a vapor pressure of 16.2 p.s.i. at $20°$ C. Table I shows the vapor pressure from $-20$ to $+50°$ C.

TABLE I.—VAPOR PRESSURE OF $POF_3 \cdot SO_3$

| Temperature, °C | −40 | −30 | −20 | −10 | 0 |
|---|---|---|---|---|---|
| Pressure, mm. Hg | 122 | 175 | 287 | 482 | 780 |
| Temperature, °C | 10 | 20 | 30 | 40 | 50 |
| Pressure, p.s.i.g | 8.2 | 16.2 | 25.3 | 37.8 | 52.0 |

Distillation at atmospheric pressure leads to dissociation of the adduct. The equilibrium is re-established in the liquid phase after condensation. The formation of the adduct occurs quite rapidly with liquid sulfur trioxide. Solid sulfur trioxide, however, requires several hours to reach the equilibrium at room temperature.

The phosphoryl fluoride-sulfur trioxide adduct was found to react with hydrogen fluoride to form phosphorus pentafluoride and sulfuric acid:

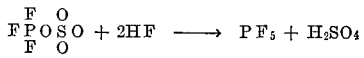

The reaction proceeds readily even as low as $-40°$ C. Subsequent heating to $60°$ C. increases the yield of the liberated phosphorus pentafluoride.

It is advantageous to introduce the hydrogen fluoride directly into the liquid adduct since HF reacts with free sulfur trioxide to form fluorosulfonic acid:

$$HF + SO_3 \rightarrow HSO_3F$$

For the same reason, I prefer to carry out the reaction initially at lower temperatures, such as $-20°$ C., where less free sulfur trioxide is present in the equilibrium.

The quantity of hydrogen fluoride employed is not critical; however, best results are obtained when 1–5, preferably 2–3, moles of HF per mole of phosphoryl fluoride are used.

The liberated phosphorus pentafluoride is vented into evacuated cold traps ($-196°$ C.) while the reactor is maintained at 20–30° C.

The product is of high purity (+95 percent) and contains only small amounts of $POF_3$ and HF which can be removed by fractional condensation.

Specific examples which are illustrative of the invention may be set out as follows:

Example I

An evacuated glass pressure reactor (100 cc.) was cooled to $-196°$ C. and charged with sulfur trioxide (10.0 g.) and phosphoryl fluoride (13.3 g.). On warming to room temperature, 200 p.s.i. pressure developed temporarily. The resulting slurry was stirred until all sulfur trioxide had dissolved, forming a clear colorless liquid with a vapor pressure of 16.2 p.s.i. at 20° C. The liquid was transferred through a syphon tube into an evacuated aluminum cylinder (250 cc.) containing hydrogen fluoride (6.8 g.) at $-40°$ C. A pressure of 50 p.s.i. developed and the cylinder was slowly warmed to 60° C. After one hour, the temperature was lowered to 25° C. and volatile material was collected in an evacuated cold trap maintained at $-196°$ C. with liquid nitrogen. The obtained $PF_5$ represented an 81 percent yield.

Example II

Phosphoryl fluoride (20.8 g.) was expanded into a stainless steel cylinder containing liquid sulfur trioxide (16.0 g.) at 50° C. After standing for 30 minutes, the pressure receded to 52 p.s.i. The liquid was transferred through a syphon tube into a second cylinder containing hydrogen fluoride (10.0 g.) at $-40°$ C. The reaction mixture was warmed to 60° C. over a period of one hour and shaken occasionally. After standing at 60° C. for one hour, the cylinder was cooled to 25° C. and the liberated phosphorus pentafluoride (19.6 g.) vented into a cold trap ($-196°$ C.).

Example III

An adduct or phosphoryl fluoride (15.6 g.) and sulfur trioxide (12.0 g. was prepared as described in Example II. After cooling to $-196°$ C., hydrogen fluoride (6.0 g.) was condensed into the reactor and the mixture allowed to warm to room temperature while shaking occasionally. After heating to 60° C. for one hour, the temperature was lowered to 25° C. and the produced phosphorus pentafluoride (14.9 g.) collected in a cold trap at $-196°$ C. The time of heating is not critical. While in the foregoing examples, I have indicated that the heating may be for an hour, the purpose was to indicate a length of time which would give a substantially complete yield of phosphorus pentafluoride. For example, heating to about 10° C. in some instances gives a yield of 50 percent, and any additional time, such as an hour or more, may be utilized to increase the production of phosphorus pentafluoride.

While in the foregoing specification, I have set out specific procedure in considerable detail for the purpose of illustrating embodiments of the invention, it will be understood that such details may be varied widely by those skilled in the art without departing from the spirit of my invention.

I claim:
1. In a process for preparing phosphorus pentafluoride, the steps of reacting phosphoryl fluoride with non-gaseous sulfur trioxide to provide a liquid phosphoryl fluoride-sulfur trioxide adduct, and then heating the adduct with hydrogen fluoride to produce phosphorus pentafluoride and sulfuric acid.
2. The process of claim 1 in which the phosphoryl fluoride and sulfur trioxide are reacted in about equimolar quantities of $POF_3$ and $SO_3$.
3. The process of claim 1 in which the liberated phosphorus pentafluoride is vented into evacuated cold traps at about —196° C. for condensation and recovery of the phosphorus pentafluoride.
4. The process of claim 1 in which about 1–5 moles of hydrogen fluoride are employed per mole of phosphoryl fluoride.
5. The process of claim 1 in which about 2–3 moles of hydrogen fluoride are employed per mole of phosphoryl fluoride.
6. As a new compound, the reaction product of phosphoryl fluoride and sulfur trioxide consisting of an adduct having the structural formula

which forms a colorless liquid freezing at about —60° C., fumes in moist air, and has a vapor pressure of 16.2 p.s.i. at 20° C.

References Cited

Des Marteau et al.: "Inorganic Chemistry," vol. 5, October 1966, pp. 1829–1831.

HERBERT T. CARTER, Primary Examiner

U.S. Cl. X.R.

23—167, 368